Figure 1:
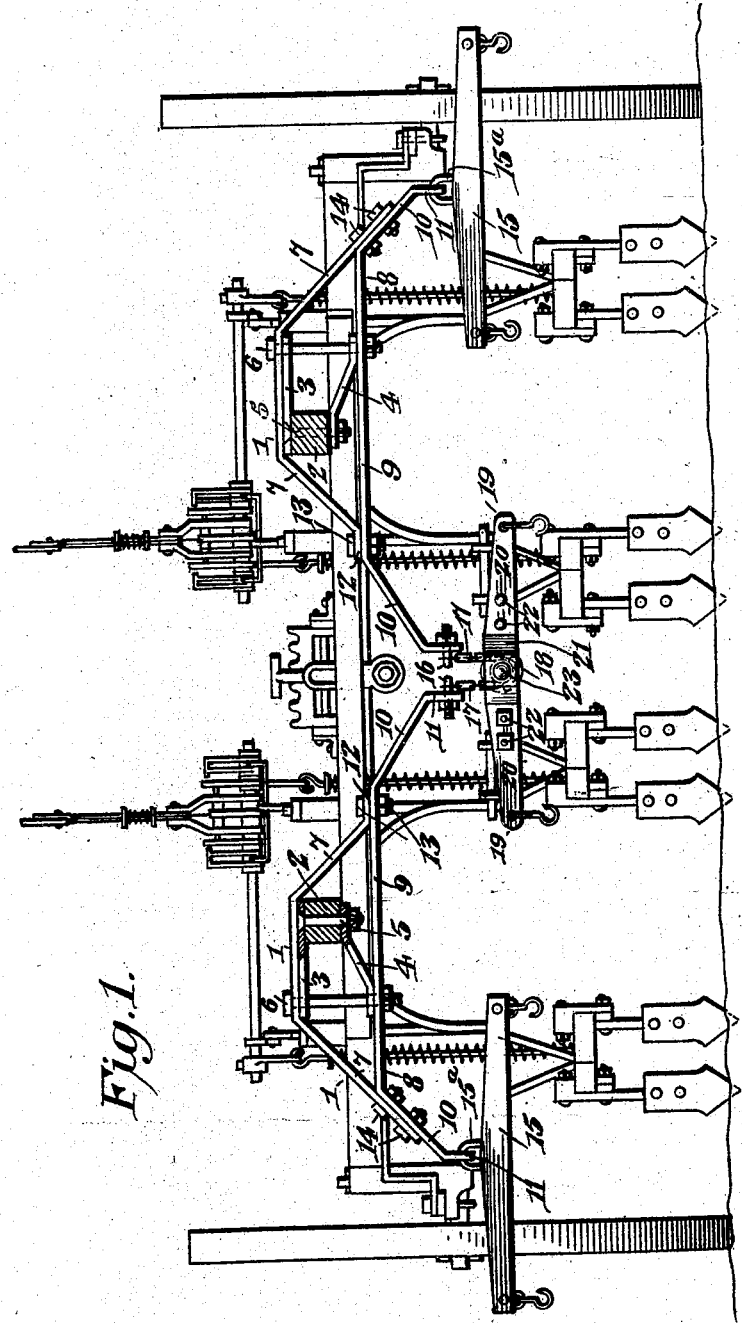

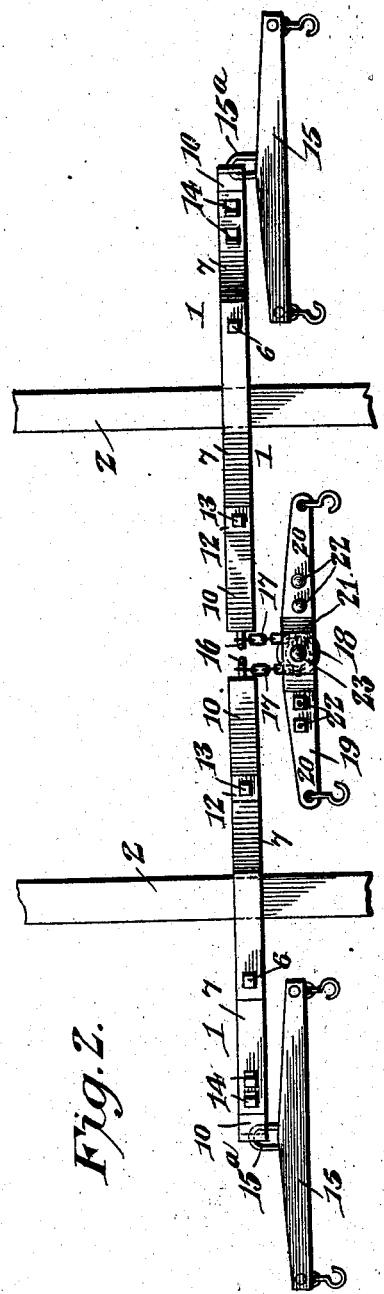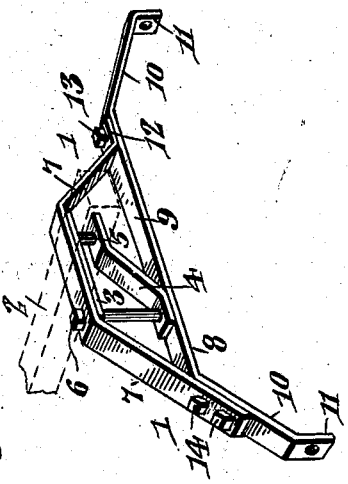

UNITED STATES PATENT OFFICE.

SILAS E. BAILOR, OF TARKIO, MISSOURI.

DRAFT-EQUALIZER.

No. 905,133.  Specification of Letters Patent.  Patented Dec. 1, 1908.

Application filed August 6, 1907. Serial No. 387,302.

*To all whom it may concern:*

Be it known that I, SILAS E. BAILOR, a citizen of the United States, residing at Tarkio, in the county of Atchison and State of Missouri, have invented a new and useful Draft-Equalizer, of which the following is a specification.

The invention relates to improvements in draft equalizers for cultivators and other agricultural implements, etc.

The object of the present invention is to improve the construction of draft equalizers, and to provide a simple, inexpensive and efficient draft equalizer of great strength and durability, designed particularly for use on two row cultivators, and adapted to enable three horses to be arranged abreast, and capable of equalizing the draft between the same.

A further object of the invention is to enable the draft beams to be arranged over two rows of plants, and at the same time arrange the equalizing levers so that their pivots will be located a sufficient distance beyond the draft beams to properly equalize the draft between the central and side horses and afford plenty of room for the side horses.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a front elevation, partly in section of a draft equalizer constructed in accordance with this invention and shown applied to a two row cultivator. Fig. 2 is a plan view of the draft equalizer. Fig. 3 is a detail perspective view, illustrating the construction of the equalizing levers and the manner of connecting the same with the draft beams. Fig. 4 is a detail view of the central swingletree.

Like numerals of reference designate corresponding parts in all the figures of the drawings.

The draft equalizer embodies a pair of transversely disposed equalizing levers 1, pivotally connected midway between the center and their outer ends with a pair of draft beams 2 of a two row cultivator, as clearly illustrated in Figs. 1 and 2 of the drawings, the inner arms or portions of the equalizing levers being twice the length of the outer arms to equalize the draft between a central draft animal and side draft animals. Although the draft equalizer is shown applied in the accompanying drawings to a two row cultivator, yet it will be readily apparent that it is applicable to various other agricultural implements and machines. The draft beams are provided with transversely disposed upper and lower bracket arms 3 and 4, projecting outwardly from the beams and rigidly secured at their inner ends to the same by means of bolts 5, or other suitable fastening devices. The upper bracket arm is straight and is arranged horizontally, while the lower bracket arm is provided with an inclined intermediate portion, extending downwardly from the draft beam to space the outer end of the lower arm the proper distance from the outer end of the upper bracket arm to fit the spaced portions of the equalizing levers, as hereinafter more fully explained.

The equalizing levers are pivotally connected to the bracket arms 3 and 4 by means of vertical bolts 6, or other suitable fastening devices, and the brackets formed by the bracket arms 3 and 4 off-set the fulcrum points of the equalizing levers from the draft beams, and the pivot bolts 6 are spaced from the outer sides of the said beams. Each equalizing lever is composed of upper and lower members 7 and 8. The lower member, which consists of a metallic strap or bar, is composed of an intermediate horizontal portion 9 and similar inner and outer inclined end portions 10, which diverge downwardly. The terminals 11 of the lower member are bent vertically and are provided with perforations. The upper member 7, which is arch-shaped, consists of a metallic strap or bar and is composed of a horizontal intermediate portion and downwardly diverging inclined inner and outer end portions. The terminal 12 of the inner end portion is bent horizontally and is secured to the lower member at the inner end of the intermediate horizontal portion by a bolt 13, or other suitable fastening device. The outer inclined end portion of the top member is set at the same angle as the outer inclined portion of the bottom member, and the terminal of the said outer inclined portion of the top member is secured to the bottom member by bolts 14, or other suitable fastening devices. The intermediate horizontally disposed straight portion of the arched upper member is arranged flat upon the horizontal bracket arm 3, and the outer horizontally disposed end of the bracket arm 4 fits against the upper face of the intermediate horizontally disposed portion of the lower member 8 of the equalizing lever. The intermediate horizontal portion of the lower member 8 is spaced from the draft beam by the downwardly inclined portion of the lower bracket arm, so that the lower member of the equalizing lever swings clear of the draft beam. The equalizing lever by its particular construction is rendered exceedingly strong, and at the same time is comparatively light. The equalizing levers are adapted to oscillate on the pivots 6, and side swingletrees 15 are secured to the outer depending terminals 11 of the lower member 8 by U-shaped fastening devices 15ª, which are linked into the perforations of the said outer terminals 11 of the lower member 8.

The inner terminals of the lower member are equipped with eye bolts 16 to which are secured the ends of a short chain 17, and the latter passes around a grooved pulley 18 of a central swingletree 19, but any other suitable flexible connection may be employed for this purpose. The central swingletree 19 consists of two metallic bars or members 20, having overlapped inner portions 21, secured together at opposite sides of the center of the swingletree by bolts 22, or other suitable fastening devices, and the said overlapped portions are spaced apart at the center of the swingletree to receive the pulley 18, which is mounted on a pivot 23.

In practice the distance between two rows of plants is about three feet six inches, and the draft beams are located directly above the rows of plants. The laterally extending brackets enable the equalizing levers to be fulcrumed a sufficient distance beyond the draft beams to secure the proper leverage for equalizing the draft between the central and side horses, and they provide plenty of room for the latter.

Having thus fully described my invention, what I claim as new and desire to secure by Letters Patent, is:—

1. The combination with a draft beam, of upper and lower transverse bracket arms extending outwardly from the said draft beam and having spaced outer ends, the lower arm having its outer end arranged in a plane below the draft beam, an equalizing lever composed of upper and lower members spaced apart to receive the draft beam and bracket arms and pivotally connected with the latter at the outer ends thereof and having their fulcrum points off-set from the draft beam by the bracket arms, the lower member of the equalizing lever being spaced from the draft beam by the lower bracket arm.

2. The combination with draft beams, of upper and lower transverse bracket arms extending outwardly from the beams, the lower bracket arms being extended downwardly below the plane of the draft beams, equalizing levers having intermediate arched portions and receiving the draft beams and pivoted to the bracket arms at the outer ends thereof and having their fulcrum points off-set from the outer sides of the draft beams by the said bracket arms, and whiffletrees connected with the ends of the equalizing levers.

3. The combination with a pair of draft beams, of a draft equalizer comprising equalizing levers embodying an upper arched member provided with an upper horizontal portion and having inclined end portions, and a lower member having an intermediate horizontal portion spaced from the lower face of the adjacent draft beam and extending beyond the sides of the intermediate portion of the upper arched member, said lower member having inclined end portions and secured at its terminals to the upper member, means for fulcruming the equalizing levers to the draft beams, and side and central whiffletrees connected with the inclined end portions of the lower member of the equalizing levers.

4. A draft equalizer comprising equalizing levers, each embodying a lower member having an intermediate horizontal portion and provided with similar inclined end portions having depending terminals, and an upper arched member consisting of a horizontal top portion and inclined end portions, the terminal of the inner end portion being bent horizontally and secured to the intermediate horizontal portion of the lower member, and the terminal of the outer inclined portion of the upper member being fitted against and secured to the inclined portion of the lower member, means for pivoting the horizontal portions of the upper and lower members at points beyond the outer sides of the beams of a cultivator, and whiffletrees connected with the equalizing levers.

5. A draft equalizer comprising transverse equalizing levers, side whiffletrees connected with the outer ends of the levers, a central whiffletree embodying metallic members having inner overlapped portions secured together at opposite sides of the center of the whiffletree and spaced apart at the said center, a pulley mounted between the spaced portions of the central whiffletree, and a flexible connection arranged on the pulley and connected with the equalizing levers.

6. The combination with a pair of draft beams, of upper and lower transverse bracket arms arranged in pairs and extending outwardly from the draft beams and having spaced outer ends, the spaces between the outer ends of the arms being greater than the thickness of the draft beams, equalizing levers composed of upper and lower members spaced apart to receive the draft beams and the bracket arms and pivotally connected with the latter at the outer ends thereof, whereby the fulcrum points of the equalizing levers are off-set from the outer sides of the draft beams and one of the members of each lever is arranged in spaced relation with the draft beams, and central and side whiffletrees connected with the equalizing levers.

7. The combination with a draft beam, and whiffletrees, of a draft equalizer including an equalizing lever embodying upper and lower members consisting of intermediate horizontal portions spaced apart to receive the draft beam and extending beyond the same, the horizontal portion of the lower member being spaced from the draft beam, and inclined inner and outer end portions, the outer inclined end portions of the upper and lower members being set at the same angle and fitted together, and the inner inclined end portion of the upper member being secured to the intermediate horizontal portion of the lower member, and the lower member being extended at the inner portion beyond the inner end of the upper member.

In testimony, that I claim the foregoing as my own, I have hereto affixed my signature in the presence of two witnesses.

SILAS E. BAILOR.

Witnesses:
C. D. BAILEY,
ALEX. RANKIN.